March 26, 1968 M. T. BORELLI ET AL 3,375,451
ADAPTIVE TRACKING NOTCH FILTER SYSTEM
Filed June 17, 1965 7 Sheets-Sheet 1

MICHAEL T. BORELLI
HARRY J DANIELS
HANS H. HOSENTHIEN
INVENTORS

BY
James O. Harrell
ATTORNEYS

March 26, 1968  M. T. BORELLI ET AL  3,375,451
ADAPTIVE TRACKING NOTCH FILTER SYSTEM
Filed June 17, 1965

MICHAEL T. BORELLI
HARRY J. DANIELS
HANS H. HOSENTHIEN
INVENTORS

BY
ATTORNEYS

ATN FILTER AMPLITUDE FREQUENCY RESPONSE

FIG. 10

MICHAEL T. BORELLI
HARRY J. DANIELS
HANS H. HOSENTHIEN
INVENTORS

ATN FILTER PHASE FREQUENCY RESPONSE

FIG. 11

PHASE SHIFT CONTROL ATTAINABLE IN
THE RC COMMUTATED NETWORK

MICHAEL T. BORELLI
HARRY J. DANIELS
HANS H. HOSENTHIEN
*INVENTORS*

BY

ATTORNEYS

MICHAEL T. BORELLI
HARRY J. DANIELS
HANS H. HOSENTHIEN
INVENTORS

BY

ATTORNEYS

United States Patent Office 3,375,451
Patented Mar. 26, 1968

3,375,451
ADAPTIVE TRACKING NOTCH
FILTER SYSTEM
Michael T. Borelli, Harry J. Daniels, and Hans H. Hosenthien, Huntsville, Ala., assignors to the United States of America as represented by the Administrator of the National Aeronautics and Space Administration
Filed June 17, 1965, Ser. No. 464,878
19 Claims. (Cl. 328—167)

ABSTRACT OF THE DISCLOSURE

An adaptive notch filter which constructs a reversed phase noise signal utilizing modulation techniques, and then sums the constructed signal with the composite input signal so that the noise signal is cancelled.

---

The invention described herein may be manufactured and used by or for the Government of the United States of America for governmental purposes without the payment of any royalties thereon or therefor.

This invention relates to a filter system of the active component type and more particularly, to an adaptive tracking filter capable of being used as an adaptive tracking notch filter for the attenuating of, or shifting the phase of, undesirable signals of a very low frequency which fall extremely close to a desired frequency pass band; or as an adaptive tracking band-pass filter for high selectivity and amplification of certain desired signals of a very low frequency in the presence of other undesired signals close to the desired pass band. Although this adaptive tracking filter system was invented to solve the structural bending feedback control problem of large elastic aeroscape boosters such as Saturn V, it can also be used in other control systems and devices where it is desired to either suppress or amplify a specific time varying signal frequency without seriously modifying other signals close to the desired pass band. This invention will be described, however, so as it can be applied to stabilize the structural bending in large aerospace vehicles.

The structural flexibility of large rockets and space booster vehicles has always presented a stability problem because the sensors utilized for controlling the vehicle also respond to the structural bending the vehicle experiences during flight. If the oscillations of the vehicle, because of structural bending, are of sufficient magnitude, and if the phase of these oscillatory signals is such that the resulting control engine motion reinforces or amplifies these bending mode signals, instability nad ultimate destruction of the vehicle will occur. Stabilization of closed-loop feedback control systems to these undesirable structural bending mode signals can be accomplished by either gain-stabilization or phase-stabilization techniques. Gain-stabilization prevails when the energy fed back to the structure through the control loop is less than that required to sustain the structure in oscillation. Phase-stabilization, obtained by proper phasing of the feedback signal, effectively removes energy from the structure and therefore forces the system back to equilibrium faster than gain-stabilization. Phase-stabilization of the lower bending modes is desirable because it is extremely difficult to get the necessary attenuation for gain-stabilization without excessive phase shift at the control frequency and also phase-stabilization reduces the structural loading of the vehicle by removing energy from the system. The gain and phase characteristics of this invention are particularly well suited for both gain-stabilization and phase-stabilization methods.

During time-of-flight, the bending mode frequencies of the vehicle will change by as much as one-half an octave because of propellant consumption. This condition demands that the control system be capable of stabilizing the vehicle over a rather wide frequency band. If filters are employed to stabilize the vehicle, to obtain the maximum gain and phase stability margins possible, a tracking filter system must be employed.

Large booster vehicles, such as Saturn V, have greatly intensified the structural bending stabilization problem because of their long relatively slender construction. Their very complex multi-stage construction, required to achieve the desired mission goals, renders complete theoretical determination of bending mode parameters impossible, so that many approximations must be made and these result in inaccuracies in the bending mode parameter calculations. Also, because of their extremely large size, it is difficult to obtain the bending mode parameters by direct dynamic testing of a prototype vehicle. Moreover, the control system for these large space vehicles must be capable of stabilizing the bending mode signals, although the characteristics of the signals are not accurately known. The large size of these vehicles has also reduced the frequency of the bending modes and the frequency of the propellant sloshing modes so they are much closer to the control frequency and closer to each other.

The adaptive tracking notch is particularly well suited to solve the stability problem caused by the structural bending of the vehicle. This invention has five major improvements over techniques previously used and they are: (1) the accuracy of the identification function or the tracking system, (2) the effective response time of the system for attenuating the undesirable bending signal, (3) the effective attenuation when used as a notch filter or the effective gain when used as a bandpass filter, (4) the non-criticality of the components and (5) the ease of changing the effective range of operation. This invention can operate over the frequency range from less than 0.7 Hz. into the kilo Hz. range with some necessary changes in components. This invention is capable of identifying, tracking and suppressing bending mode signals over a frequency range of about 1.5 octaves without any change in adjustments or components; the attenuation provided by this invention over the tracking ranges exceeds —46 db. It is also possible to operate units of this invention in cascade with each other in order to suppress more than one bending mode signal in a single control channel.

Accordingly, the primary objects of this invention is to provide an active element notch or band-pass filter having very sharp attenuation characteristics.

Another object of this invention is to provide an active element notch filter and control system therefor which can track and effectively attenuate an unwanted time-varying signal, or shift the phase by a desired amount.

Yet another object of this invention is to provide a low frequency adaptive tracking notch filter system that has a substantially flat frequency response except in the vicinity of the notch frequency.

A further object of this invention is to provide an adaptive tracking notch filter system having a fast response time.

A still further object of this invention is to provide a low frequency, ultra-fast adaptive tracking notch filter system having a self-centering notch positioning characteristic for seeking out and locking on an undesirable time varying signal.

These and other objects and advantages of this invention will be more apparent upon reference to the following specification, appended claims and drawings wherein:

In order to better understand the construction and use of this novel notch (or band-pass) filter system, it will be described in connection with its use on a rocket powered launch vehicle of the Saturn V class for which it was primarily designed. It is to be understood, however, that various other uses may be found for this novel filter system. For example, a notch filter system constructed in accordance with this invention will give superior results when used in the control loop of ultra fast aerospace vehicles for suppressing undesirable control loop signals. Other uses will be readily apparent to those skilled in the art.

With continued reference to the accompanying drawings wherein like numerals designate similar parts throughout the various views, and with initial attention directed to FIGURE 1, reference numeral 10 designates an adaptive tracking notch filter system which hereinafter will be referred to as an ATN filter system. The three major problems solved by the ATN filter system 10 are (1) identification, (2) logic or decision, and (3) modification. The identification problems is one of distinguishing the bending mode signal to be suppressed or cancelled from a composite signal containing control information, higher bending mode signals, etc. In the present invention an active band-pass filter handles the identification problem.

The decision problem of the ATN filter system is a simple yes or no as to when the notch should be used. This decision is a function of a threshold detection section and, although a fixed preselected value for actuating the filter is described hereinbelow, this could be made adjustable if desired.

The techniques utilized for coping with the modification problem are highly important features of the ATN filter system since the system must be capable of modifying or varying itself as the bending mode frequency changes during time of flight. This modification is carried out by a commutating signal generator that generates a variant multi-phase signal having the same frequency as the bending mode signal which is utilized to construct a reversed phase bending signal. By summing the constructed multi-phase signal with the composite input signal, the original bending mode signal is cancelled or attenuated.

Figure 1:
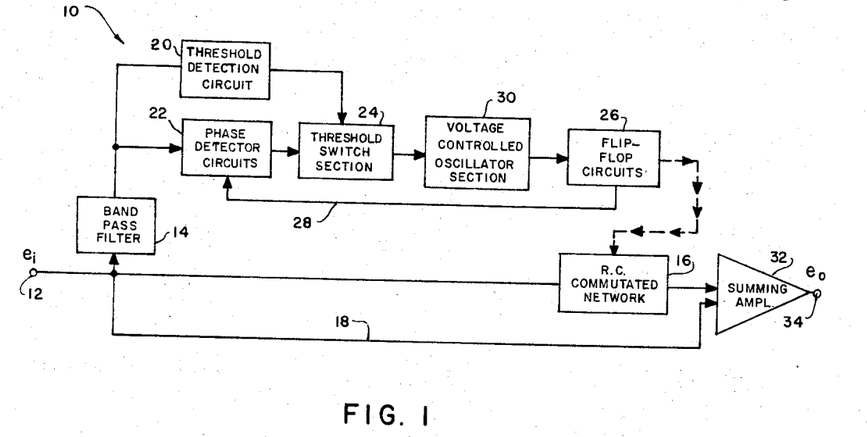
FIGURE 1 is a schematic diagram showing the adaptive tracking notch filter system of the present invention.

As mentioned hereinabove, the basic sections of the ATN filter system 10 are shown in FIGURE 1 wherein the solid lines represent electrical connections while the dotted line represents mechanical connections. As can be seen, the ATN filter system consists essentially of an input 12 which is connected electrically to a band-pass filter 14, an RC commutated network 16 and a feed-forward circuit 18. The band-pass filter 14 is connected electrically to both a threshold detection circuit 20 and a phase detector circuit 22.

The threshold detection circuit 20 is in turn connected electrically to a threshold switch section 24. The phase detector circuit 22 is connected electrically to both the threshold switch section 24 and flip-flop circuits 26 by means of a feedback circuit 28. The threshold switch section 24 is also connected electrically to a voltage-controlled oscillator section 30. The voltage-controlled oscillator section 30 is connected electrically to the flip-flop circuits 26. The flip-flop circuits 26 are connected electrically to the phase detector circuit 22 and connected mechanically to the RC commutated network 16. The RC commutated network 16 is also connected electrically to both the input 12 and a summing amplifier 32. The feed-forward circuit 18 is likewise connected electrically to both the input 12 and the summing amplifier 32. The output of the ATN filter system 10 is taken from the summing amplifier 32 at an output terminal 34. Note that feed-forward circuit 18 leading from the input 12 to the summing amplifier 32 could be eliminated and the resulting filter system would constitute an adaptive tracking band-pass filter for amplifying the desired time varying frequency signal.

The signal applied to the input 12 of the ATN filter system 10 comes from a sensor, such as a position gyro, accelerometer or rate gyro on the launch vehicle which is sensitive to structural bending, propellant sloshing, etc. The input into the band-pass filter 14 is not required to come from the input terminal 12, but could equally come from some separate sensor providing it contained the required signal frequency to be suppressed. The specific technique for eliminating a particular undesirable signal, which in the illustrated environment is a bending mode signal from this composition of signals, will be explained in detail hereinafter.

*Band pass filter*

Figure 2:
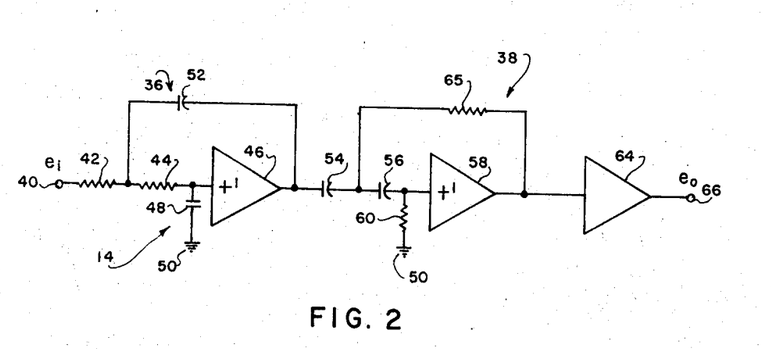
FIGURE 2 is a circuit diagram of the band-pass filter.

As stated hereinabove, it is very difficult to obtain a passive type of band-pass filter suitable for operation at very low sub-audio frequencies. Inductors become very large physically and their low Q-factors limit the sharp cutoff characteristics desirable in the band-pass filter. Therefore, the band-pass filter 14 for the frequency identification section of the ATN filter system 10 was designed as an active rather than passive type of band-pass filter. As shown in FIGURE 2, the band-pass filter 14 is composed of at least two cascaded stage sections 36 and 38. The first active band-pass stage 36 is of the low pass type and the second stage 38 is of the high pass type. Additional high and/or low pass stages can be added in cascade if the band-pass filtering requires greater selectivity for the identification of the bending mode signal frequency. In the first stage 36, an input 40 is connected to a resistor 42 which in turn is connected to a resistor 44. A positive unity gain amplifier 46 is also connected to the resistor 44. Connected between the resistor 44 and amplifier 46 is a capacitor 48 which leads to ground 50. A capacitor 52 is also connected to the outputs of the resistor 42 and amplifier 46. The first stage 36 leads to the second stage 38 which consists of a capacitor 54 which in turn is connected to a capacitor 56. A positive unity gain amplifier 58 is also connected to the capacitor 56. Connected between the capacitor 56 and amplifier 58 is a resistor 60 which leads to ground 50. A resistor 65 is also connected to the outputs of the capacitor 54 and amplifier 58. An output amplifier 64 is positioned between an output 66 and the first and second stages 36 and 38. The input impedance of each of the amplifiers 46 and 58 is high, greater than one megohm, and the output impedance is low. This type of amplifier is preferred to prevent undesirable gain changes from modifying the frequency response characteristics of the filter network.

In the case where the frequency of the bending mode signal to be suppressed by the ATN filter system 10 falls between 0.7 Hz. and 1.4 Hz., as is true for the primary bending mode frequency of a Saturn V launch vehicle, the overall transfer function for the first and second bandpass stages 36 and 38 of FIGURE 2 will have the following characteristics:

$$\frac{e_0}{e_i} = \frac{\omega_1^2 s^2}{(s^2 + 2\zeta_1\omega_1 s + \omega_1^2)(s^2 + 2\zeta_2\omega_2 s + \omega_2^2)} \quad (1)$$

where $s$ is the Laplace operator and $\zeta_1$ and $\zeta_2$ are the damping factors of the first stage 36 and the second stage 38, respectively, and $\omega_1$ and $\omega_2$ are the cut-off frequencies of the first and second stages 36 and 38, respectively. Adjustment of the R (resistance) and C (capacitance) parameters in the first and second stages 36 and 38 will permit the band-pass filter 14 to identify other signal frequencies, such as the higher bending mode signal frequencies. The output amplifier 64 is used to increase the gain in the bending mode signal to be cancelled.

Threshold detection circuit and threshold switch section

Figure 3:
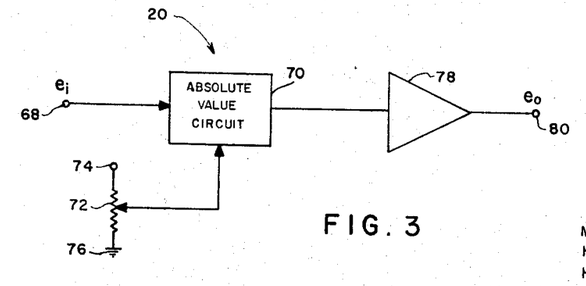
FIGURE 3 is a more detailed schematic diagram of the thereshold detection circuit.

As shown in FIGURE 1 and more in detail in FIGURE 3, the threshold detection circuit 20 and threshold switch section 24 operate as a unit to permit the phase detector circuit 22 to drive the voltage controlled oscillator section 30 and thereby achieve phase-locked operation through the feedback circuit 28, from the flip-flop circuits 26 to the phase detector circuit 22, whenever the input bending mode signal from the band-pass filter 14 exceeds a pre-selected amplitude value. The threshold detection circuit 20 consists of an input 68 and two DC operational amplifiers (not shown) connected in an absolute value circuit 70 to obtain the absolute value of the input signal. A potentiometer 72, having a positive reference voltage source 74 and ground 76, is connected electrically to the absolute value circuit 70 to provide the pre-selected amplitude threshold value. The absolute value circuit 70 is connected electrically to a switching amplifier 78 which in turn is connected to an output 80. The switching amplifier 78 controls the threshold switch section 24 which consists of conventional electronic switches.

Phase detector circuit

Figure 4:
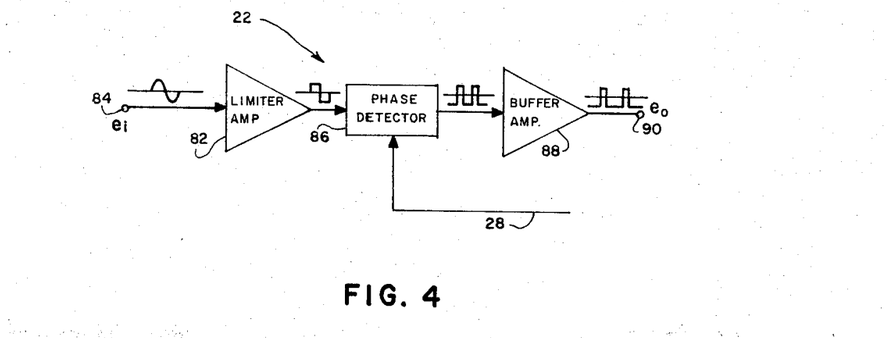
FIGURE 4 is a more detailed schematic diagram of the phase detector circuit.

In FIGURE 4, the phase detector circuit 22 is shown consisting of three main sections. The first section is a limiter amplifier 82 which is connected to an input 84 leading from the band-pass filter 14. The limiter amplifier 82 is a high gain amplifier that switches from positive saturation limit to the negative saturation limit depending upon the polarity of the input signal. The output of the limiter amplifier 82, essentially a square wave, is fed into the second section which is a phase detector 86; the other signal being fed into the phase detector 86 by the feedback circuit 28 is also a square wave from the flip-flop circuits 26. The phase detector 86 consists of diode logic circuits (not shown) and its output is fed into a buffer amplifier 88, the third section. The buffer amplifier 88 is connected to an output 90 and drives the electronic switches of the threshold switch section 24 which produce a pulse width modulated signal with a DC component proportional to the difference in phase between the two inputs to the phase detector circuit 22. As shown in FIGURE 4, the phase detector circuit 22 changes the signal at input 84 from a sine wave to essentially a square wave at the output 90.

Voltage controlled oscillator section

Figure 5:
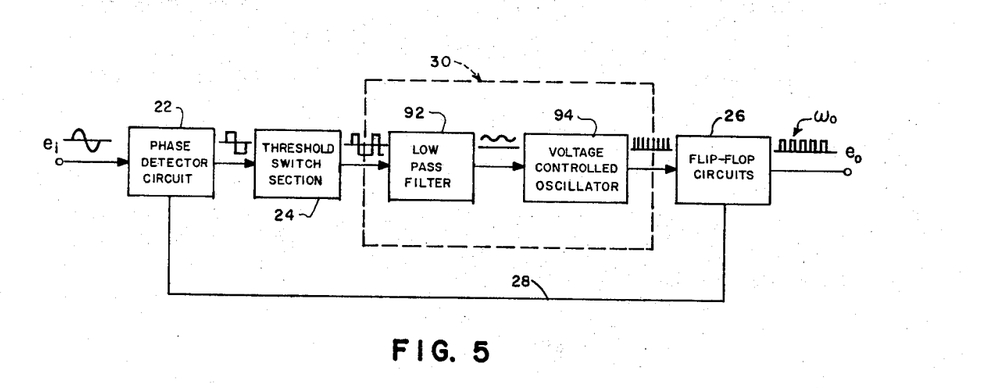
FIGURE 5 is a schematic diagram showing the phase-locked oscillator which includes the voltage controlled oscillator section.

In FIGURE 5, the voltage controlled oscillator section 30 is shown in relation to the phase detector circuit 22, threshold switch section 24 and flip-flop circuits 26. The voltage controlled oscillator section 30 receives its input from the threshold switch section 24. The input section of the voltage controlled oscillator section 30 is a low pass filter 92 that suppresses the AC component present in the pulse width modulated wave coming from the threshold switch section 24. The remaining DC portion of the filtered pulse width modulated wave is fed into a voltage controlled oscillator 94 which produces a signal frequency which is controlled by this DC voltage from the low pass filter 92. The voltage controlled oscillator 94 is an RC relaxation type oscillator and the output therefrom is a series of pulses, eight times the bending mode signal frequency. The particular changes in the shape of the signal wave are also illustrated graphically in FIGURE 5.

When the threshold detection circuit 22 does not turn the threshold switch section 24 on, the bending mode amplitude signal being below the threshold value, a DC reference voltage is constantly supplied to the voltage controlled oscillator 94 to provide an output frequency in the approximate middle of the expected bending mode frequency range.

Flip-flop circuits

Figure 6:
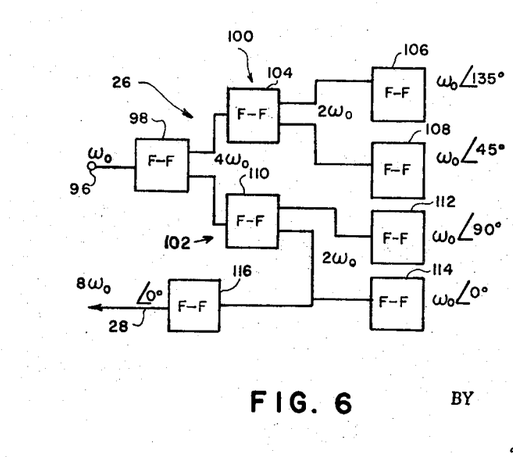
FIGURE 6 is a more detailed schematic diagram of the flip-flop circuits.

As shown in FIGURE 6, the flip-flop circuits 26 have an input 96 connected electrically to a flip-flop circuit 98 which in turn is connected to two main circuits 100 and 102. The main circuit 100 has three flip-flop circuits 104, 106 and 108 connected in the manner shown in FIGURE 6; whereas the main circuit 102 has three similar flip-flop circuits 110, 112 and 114. The seven flip-flop circuits 98–114 (indicated by reference F—F in FIGURE 6) are utilized to divide the frequency from eight times the primary bending mode frequency down to the input frequency $\omega_0$. An eighth flip-flop circuit 116 is connected to the output of flip-flop circuit 110 and to the phase detector circuit 22 by the feedback circuit 28 to constitute a phase-locked oscillator.

The outputs of the flip-flop circuits 106, 108, 112 and 114 have a precise 0, 45°, 90° and 135° relationship that is required for the four unit RC commutating network 16. The phase difference in degrees, between commutated capacitors (not shown) in each of these flip-flop circuits can be expressed as:

$$\Delta\varphi = \frac{\pi}{N} \quad (2)$$

where N is the number of commutated capacitors, for an even number of units and $$\Delta\varphi = \frac{2\pi}{N} \quad (3)$$

for an odd number of commutated capacitors $(n>1)$. The flip-flop circuits 106, 108, 112 and 114 also have outputs (not shown) which are connected electrically to coils 119, 121, 123 and 125 of commutating relays 120, 122, 124 and 126 will be explained more in detail in connection with RC commutating network 16 shown in FIGURES 7, 8 and 9.

RC commutated network

Figure 7:
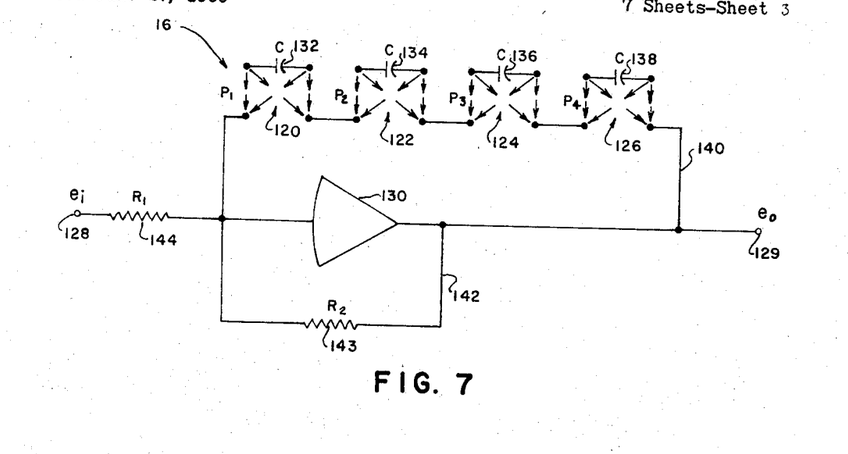
FIGURE 7 is a circuit diagram showing one embodiment of the RC commutated network.
Figure 8:
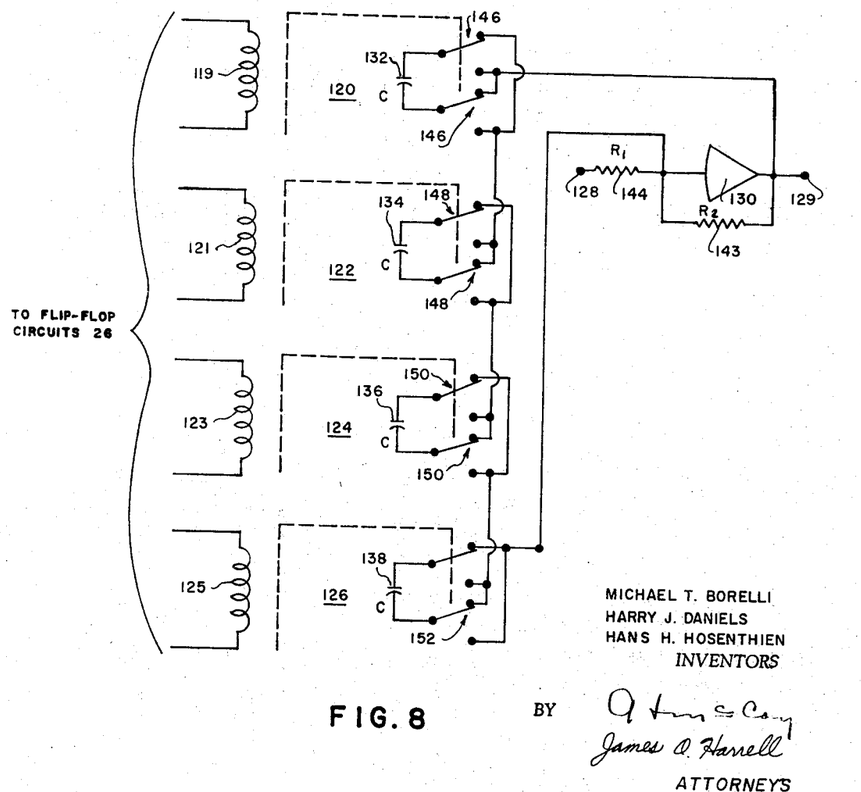
FIGURE 8 is a detailed circuit diagram of the commutating relays.

The RC commutated network 16 consists of an input 128, output 129, operational amplifier 130, and the commutating relays 120, 122, 124 and 126 with four mechanically commutated capacitors 132, 134, 136 and 138 connected in a negative feedback circuit 140, as shown in FIG. 7. A second negative feedback circuit 142 has a fixed resistor 143 which is connected to the input and output of operational amplifier 130. Connected forward of the operational amplifier 130 is an input resistor 144.

The ratio of the resistance $R_2$ of the fixed resistor 143 to the resistance $R_1$ of the input resistor 144 determines the DC gain of the RC commutated network 16. The capacitors 132, 134, 136 and 138 are commutated at the bending mode signal frequency by the relay contacts 146, 148, 150 and 152 (FIGURE 8) of the corresponding relays 120, 122, 124 and 126 which are driven by the flip-flop circuits 26 of the phase-locked oscillator shown in FIG. 5. The capacitance of the capacitors 132, 134, 136 and 138 is represented by the reference C in FIGS. 7 and 8. The commutation action of the relays 120, 122, 124 and 126 can be represented as commutation functions $P_1$, $P_2$, $P_3$ and $P_4$ (FIG. 7) which are unity square waves separated in phase by 45 degrees, or $$P_n(t) = \frac{4}{\pi} \sum_{k=1}^{\infty} \frac{1}{2k-1} \sin (2k-1)\left[\omega_0 t - \theta - (n-1)\frac{\pi}{4}\right] \quad (4)$$

where $n = 1, 2, 3, 4$ and $\theta$ is the phase angle between input bending signal of frequency $\omega_0$ and the first commutation function $P_1$. As shown more in detail in FIG. 8, the commutating relays 120, 122, 124 and 126 consist of a plurality of coils 119, 121, 123 and 125 for actuating a corresponding plurality of the relay contacts 146, 148, 150, and 152, and the commutated capacitors 132, 134, 136 and 138 mentioned hereinbefore.

The objective of this RC commutated network 16 is to construct a signal of the same frequency and magnitude, but of the opposite phase as the input bending mode signal that is to be suppressed. Note that since the bending mode signal varies on both frequency and magnitude in accordance with time, the signal to be constructed by the RC commutated network 16 must also vary in the same manner. This objective of the RC commutated network 16 is accomplished by first demodulating the input signal, represented as $e_i$, by the commutation action of the commutating relays 120, 122, 124 and 126. From this point, the operation of the RC commutated network 16 can be best explained by the schematic representation in FIG. 9 which shows an equivalent network 153. This demodulation function is accomplished in the equivalent network 153 of FIG. 9 by the $P_n$ functions in a series of multipliers 156. The demodulated signal is then integrated and filtered in integrators 158 and their outputs are then modulated by the $P_n$ functions, which are performed by multipliers 160. The outputs of the multipliers 160 are then summed in an amplifier 162 and the output signal $e_o$ appears at terminal 164. In this coupled arrangement, the output signal $e_o$ at terminal 164 is multiplied by a fixed ratio, represented by a feedback potentiometer 166, and fed back to be summed with the input at an amplifier 168.

The wave shape of the constructed output signal $e_o$ appearing at terminal 164 will not be the same as the input signal $e_i$ but it will have the same fundamental frequency, as the bending signal being tracked and this fundamental component of output signal $e_o$ will have the same magnitude and approximately 180 degrees phase with respect to the input signal $e_i$. Additional harmonics will appear in the output signal $e_o$ depending on the number and phasing of the commutating capacitors. For the circuit shown in FIG. 7, with the four commutated capacitors 132, 134, 136 and 138, the lowest frequency harmonic appearing in the output signal $e_o$ at terminal 129 (or terminal 164 in FIG. 9) is the seventh harmonic of the input frequency $\omega_0$. The feedback potentiometer 166 in FIG. 9 determines the magnitude of the output signal $e_o$.

Accordingly, the output signal $e_o$ of the RC commutated network 16 of FIG. 7 may be determined by the following equation:

$$e_o(t) = -\sum_{n=1}^{4} \frac{P_n(t)}{\tau} \int P_n(t)[e_i(t) + Ke_o(t)]dt \quad (5)$$

Figure 9:
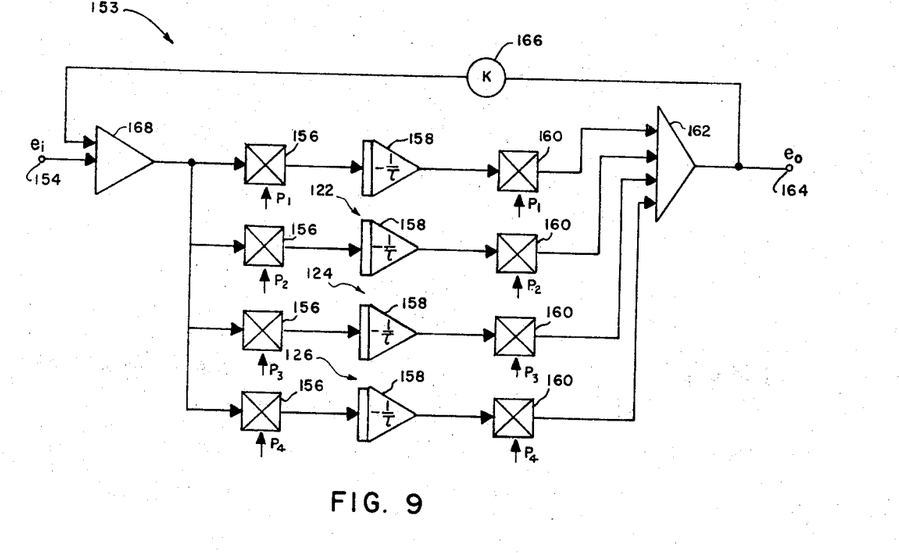
FIGURE 9 is a schematic representation of the RC commutated network.

This equation is easily derived from the equivalent network 153 of FIG. 9, where $\tau = R_1 C$ and $$K = \frac{R_2}{R_1}$$

in FIGURE 7.

The transfer function of the RC commutated network 16 of FIG. 7 has been calculated and is determined by the following equation:

$$\frac{e_o(s)}{e_i(s)} = -\frac{\alpha_0\left(1 - \frac{\tan \beta}{\beta}\right) - D\alpha_0\left(\frac{\tan \beta}{\beta}\right)}{s + K\alpha_0\left(1 - \frac{\tan \beta}{\beta}\right) - D(s + K\alpha_0)\frac{\tan \beta}{\beta}} \quad (6)$$

where:

$$D = \frac{K\alpha_0}{s + K\alpha_0}\left[\frac{\pi s(s + K\alpha_0)}{K\alpha_0 8\omega_0}\left(\coth \frac{\pi s}{8\omega_0} - \coth \frac{\pi(s + K\alpha_0)}{8\omega_0}\right) - 1\right]$$

$$\beta = j\frac{\pi}{2}\frac{s}{\omega_0}$$

and $$\alpha_0 = \frac{4}{\tau}$$

Figure 10:
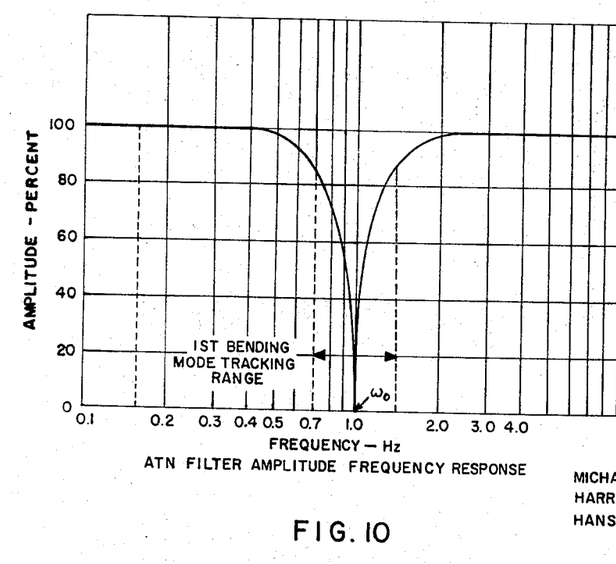
FIGURE 10 is a graph showing the amplitude frequency response of the adaptive tracking notch filter system.
Figure 11:
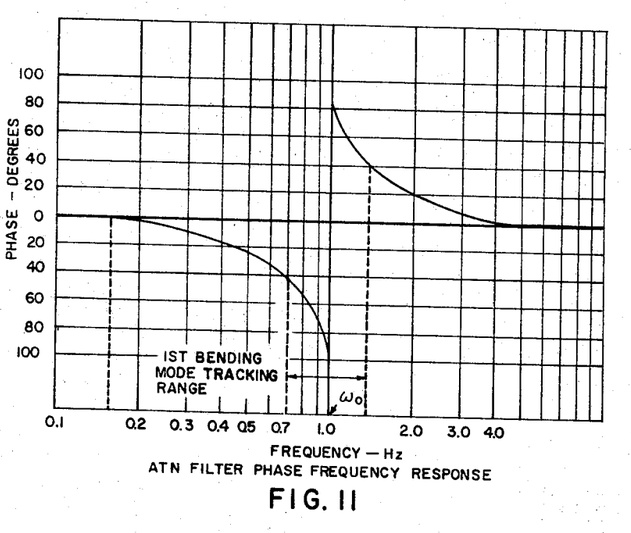
FIGURE 11 is a graph showing the phase frequency response of the adaptive tracking notch filter system.

The output of the RC commutated network 16 has the characteristics of a very sharp band-pass filter and when it is combined with the feedforward circuit 18 as shown in FIG. 1, the result is a very deep notch filter. Typical amplitude and phase frequency response characteristics for the ATN filter system 10 are shown in FIGS. 10 and 11, respectively. These curves do not account for any of the harmonics resulting from the commutation action of the capacitors 132, 134, 136 and 138 but only represent the behavior of the fundamental frequency $\omega_0$. This frequency response characteristics of the RC commutated network 16 are obtained by keeping the control frequency into the band-pass filter 14 constant (in FIGS. 10 and 11 at 1.0 Hz.), and varying the frequency of the signal into the RC commutated network 16. The frequency response characteristics of the RC commutated network 16 without the feedforward circuit 18 would be essentially the inverse of FIGS. 10 and 11. The ATN filter amplitude and phase characteristics remain essentially uniform throughout the indicated first bending mode frequency range (0.7 to 1.4 Hz.), and the phase lag at the control frequency $\omega_c$ is relatively small, on the order of 5 degrees. The ATN filter system of the present invention is capable of attenuating the input signal $e_i$ by as much as 46 db across its tracking range of 0.7 to 1.4 Hz. Moreover, the ATN filter system 10 will give similar good performance when its tracking circuit, consisting of the band-pass filter 14, threshold detection circuit 20, phase detector circuit 22, threshold switch section 24, voltage-controlled oscillator section 30 and flip-flop circuits 26, is adjusted to operate in a different range. The width of the notch is determined by the product of $R_1 C$ and the depth of the notch by the ratio $R_2/R_1$ of the components shown in FIG. 7.

As previously mentioned the shape of the phase frequency response curve is essentially the same throughout the frequency range of the first bending mode $\omega_0$, offsetting the notch from the actual bending frequency yields a fixed amount of phase shift $\omega_0$, resulting in an adaptive tracking offset notch filter. For example, in FIG. 11, if the actual bending mode frequency was 1.4 Hz., by offsetting the notch below $\omega_0$ at 1.0 Hz., the bending signal at 1.4 Hz., would be given approximately 38 degrees phase lead and at the same time be attenuated approximately 10%, as seen from FIG. 10. Thus phase lead and attenuation are obtained at the same time. Phase lag can be obtained by offsetting the notch above the bending frequency $\omega_0$.

Figure 12:
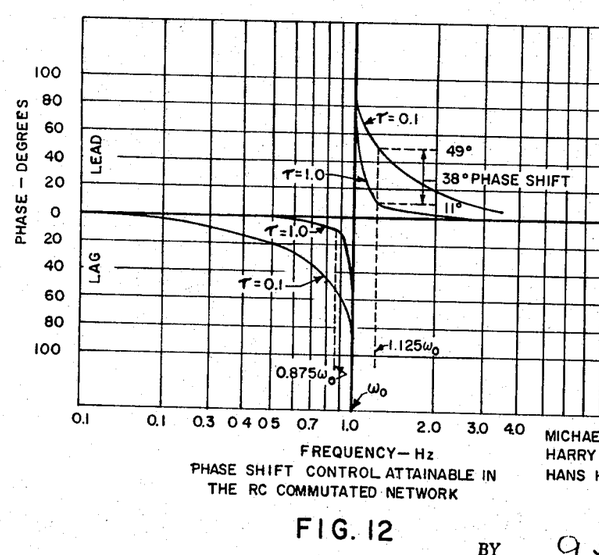
FIGURE 12 is a graph showing the phase shift control attainable in the RC commutated network.

Additional variation in phase control can be obtained by adjusting the value of $\tau(R_1C)$ in FIG. 7 to that shown in FIG. 12. A 10 to 1 change in τ results in a 38 degree phase shift.

Figure 13:
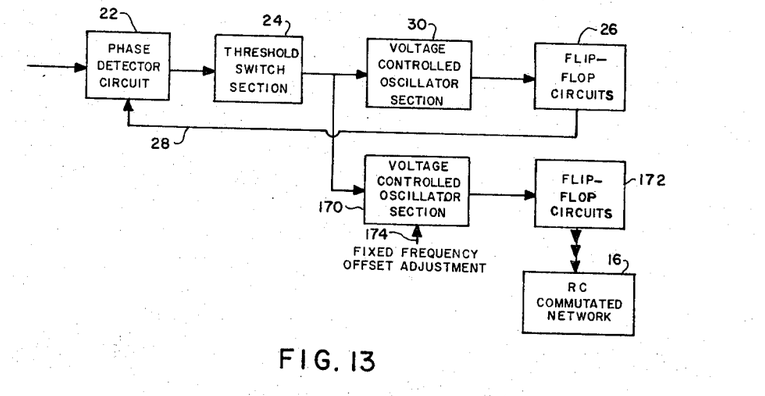
FIGURE 13 is a partial schematic diagram of the adaptive tracking notch filter system with additional flip-flops circuits and voltage controlled oscillator section.

The offset notch can be obtained by using a second voltage-controlled oscillator section 170 and flip-flop circuits 172, as shown in FIG. 13. By using the single voltage-controlled oscillator section 30 and additional flip-flop circuits (not shown), an incremental frequency offset can be obtained by anyone versed in the art. When the second voltage controlled oscillator section 170 is used, a constant voltage source 174 is used to bias the voltage controlled oscillator (not shown) a fixed amount.

Figure 14:
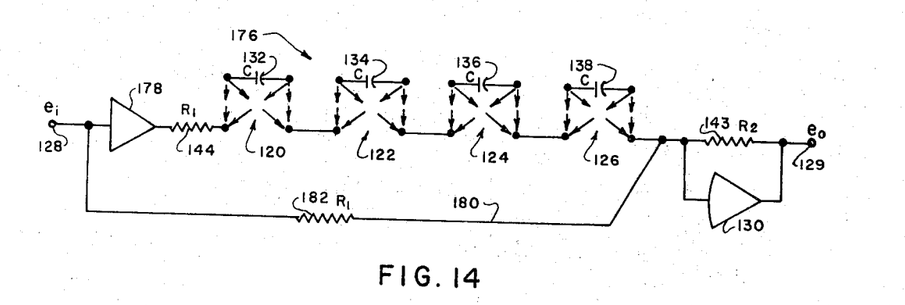
FIGURE 14 is a circuit diagram showing an alternative embodiment of the RC commutated network.

Shown in FIGS. 14, 15, 16 and 17 are alternative embodiments of the RC commutated network 16. The RC commutated network 16 is actually termed the "current mode" of a coupled RC commutated network. The term "coupled" denotes the interaction between the commutated RC elements. In FIG. 14 there is shown an alternative RC commutated network 176 which is identified as the "voltage mode" of a coupled RC commutated network. This RC commutated network 176 is similar to the RC commutated network 16 of FIG. 7 with the addition of an amplifier 178 and a feedward circuit 180 having a resistor 182 whose resistance is the same as resistance $R_1$ of resistor 144.

Figure 15:
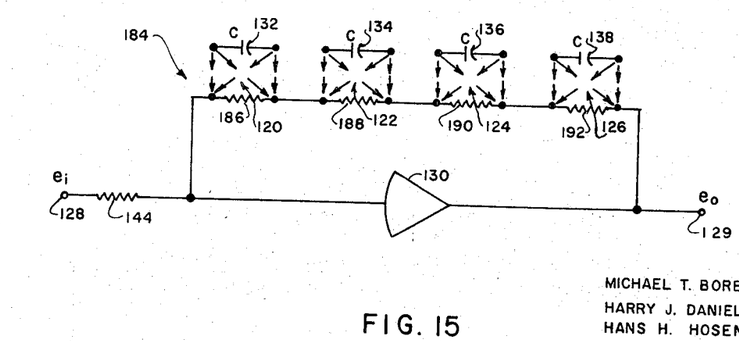
FIGURE 15 is a circuit diagram showing another alternative embodiment of the RC commutated network.
Figure 16:
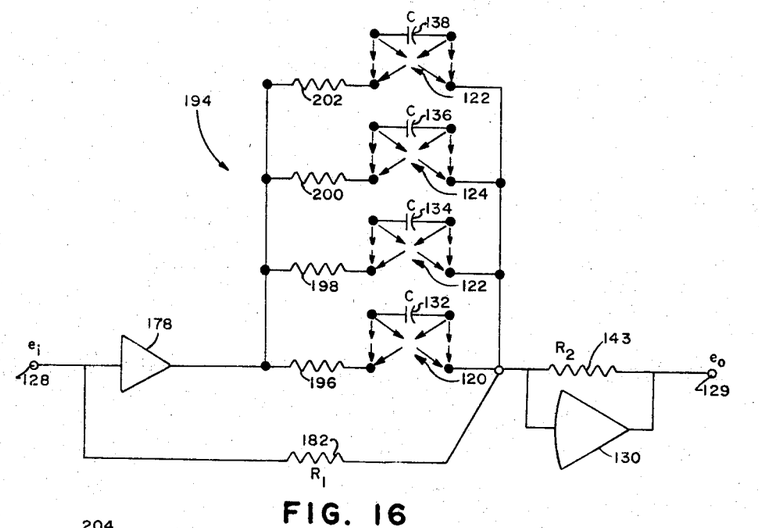
FIGURE 16 is a circuit digram showing still another alternative embodiment of the RC commutated network.
Figure 17:
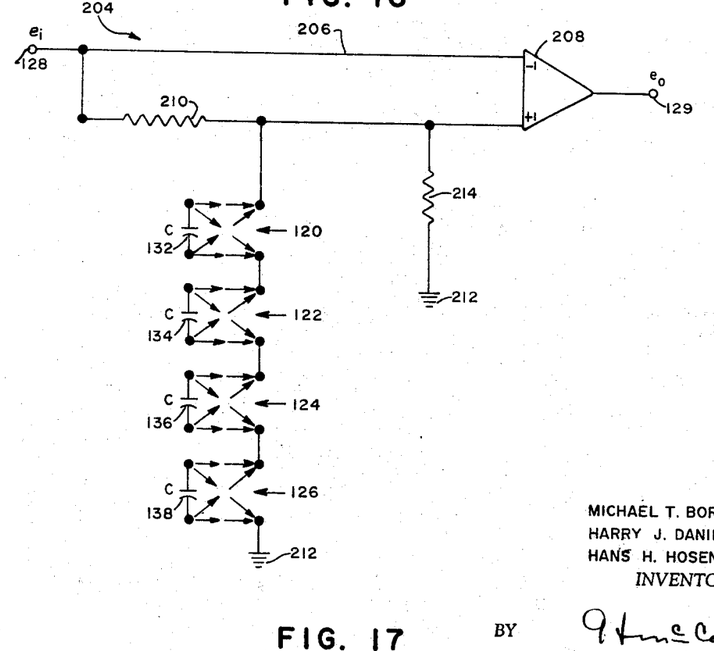
FIGURE 17 is a circuit diagram showing still another alternative embodiment of the RC commutated network.

In FIG. 15, an alternative RC commutated network 184 is shown with the elimination of the circuit 142 and resistor 143 in the RC commutated network 16 and the addition of resistors 186, 188, 190 and 192 in parallel with the commutated capacitors 132, 134, 136 and 138. This RC commutated network 184 may be called the "current mode" of an uncoupled RC commutated network. As shown in FIG. 16, another modified RC commutated network 194 is similar to the RC commutated network 176. The RC commutated network 194 eliminates the resistor 144 from the RC commutated network 176 and adds resistors 196, 198, 200 and 202 in the circuits for commutated capacitors 132, 134, 136 and 138. This RC commutated network 194 may be identified as the "voltage mode" of an uncoupled RC commutated network. In the "voltage mode" type of RC commutated network (FIGS. 14 and 16), the feedforward circuit 180 is included as a part of the RC commutated network itself and, accordingly, by proper adjustment of resistor 182 the output of the RC commutated networks 176 and 194 will have the notch filter characteristics rather than the band-pass characteristics of the "current mode" type of RC commutated networks 16 and 184. In FIG. 17, an alternative RC commutated network 204 includes a feedforward circuit 206 and a differential type of amplifier 208. The output side of a resistor 210 is connected electrically to the commutated capacitors 132, 134, 136 and 138 which leads to a ground 212. A resistor 214 is also included in the circuit and leads to a ground 212. The alternative RC commutated networks 176, 184, 194 and 204 achieve results comparable to the RC commutated network 16 and may therefore be used in the ATN filter system 10 as shown in FIG. 1. While each of the foregoing RC commutated networks utilizes four commutated capacitors, it is to be understood that any even or odd number of commutated capacitors can be employed to satisfy a particular need. Electronic switch components may also be used in lieu of the commutating relays 120, 122, 124 and 126.

From the above description, one having ordinary skill in the art can readily see that the ATN filter system of the present invention constitutes an effective means for attenuating or suppressing undesirable variant signals from a composite of desirable variant signals in a control system. With specific reference to attenuating undesirable blending mode signals of a rocket vehicle, the operation of the ATN filter system 10 may be briefly summarized in the following manner. During the launching of the rocket vehicle, a composite of input signals for controlling the operation of the rocket engines is fed into a control system which includes the ATN filter system 10. The composite of input signals includes undesirable bending mode signals generated by the structural bending of the rocket vehicle itself. These undesirable bending mode signals are distinguished from the desirable control signals by means of a main tracking circuit which includes the band-pass filter 14, phase detector circuit 22, threshold detection circuit 20, threshold switch section 24, flip-flop circuits 26 and voltage controlled oscillator section 30. The commutation action of the commutated capacitors 132, 134, 136 and 138 in the commutating relays 120, 122, 124 and 126 of the RC commutated network 16 constructs signals of opposite phases and substantially the same frequencies and magnitudes as that of the undesirable bending mode signals. These constructed signals are then summed in the summing amplifier 32 with the undesirable bending mode signals and the composite of input signals. Accordingly, the undesirable bending mode signals are attenuated or suppressed from the composite of input signals which control the actuation of the rocket engines and the rocket vehicle is thereby stabilized during the launching thereof.

Obviously numerous modifications and variations of the present invention are possible in light of the above teachings. It is, therefore, to be further understood that within the scope of the appended claims, the invention may be practiced otherwise than as specifically described and illustrated.

What is claimed is:

1. A filter system for attenuating an undesirable time variable frequency signal which interferes with a desirable time variable frequency signal in a control system, comprising:
   means for identifying said undesirable time variable frequency signal in said control system;
   means for distinguishing said undesirable time variable frequency signal from said desirable time variable frequency signal;
   means for constructing a time variable frequency signal of opposite phase and substantially the same frequency as that of said undesirable time variable frequency signal;
   means for summing said constructed time variable frequency signal with said undesirable and desirable time variable frequency signals;
   said means for constructing a time variable frequency further having:
      a plurality of commutating relays;
      said plurality of commutating relays having commutated capacitors;
      an operational amplifier connected to said commutated capacitors; and
      a plurality of resistors connected to said commutated capacitors and operational amplifier.

2. A filter system as defined in claim 1 wherein said plurality of commutating relays consists of an even number of commutating relays.

3. A filter system as defined in claim 1 wherein said plurality of commutating relays consists of an odd number of commutating relays.

4. An apparatus for tracking a time variable frequency signal throughout a frequency range, identifying and suppressing said time variable frequency signal from an input composite signal of several different frequencies, comprising:
   (a) a band-pass filter;
   (b) phase detector and threshold detection circuits connected to said band-pass filter;
   (c) a threshold switch section connected to said phase detector and threshold detection circuits;
   (d) a voltage controlled oscillator section connected to said threshold switch section;
   (e) a plurality of flip-flop circuits connected to said voltage controlled oscillator section;
   (f) a feedback circuit connected between said plurality of flip-flop circuits and said phase detector circuit;

(g) an RC commutated network connected to said plurality of flip-flop circuits;
(h) a summing amplifier connected to said RC commutated network; and
(i) a feedforward circuit connected between said band-pass filter and summing amplifier.

5. An apparatus as defined in claim 4 wherein said voltage controlled oscillator section comprises a low pass filter and voltage controlled oscillator, thereby forming a phase-locked type of oscillator.

6. An apparatus as defined in claim 4 wherein said band-pass filter comprises:
(a) a first cascaded stage section including a plurality of resistors and capacitors connected with a positive unity gain amplifier;
(b) one of said plurality of capacitors in said first cascaded stage section being connected to a first ground;
(c) a second cascaded stage section including a plurality of capacitors and resistors connected with a positive unity gain amplifier;
(d) one of said plurality of resistors in said second cascaded stage section being connected to a second ground; and
(e) an amplifier connected to said second cascaded stage section.

7. An apparatus as defined in claim 4 wherein said plurality of flip-flop circuits include at least four flip-flop circuits having 0°, 45°, 90° and 135° phase relationships.

8. An apparatus as defined in claim 4 wherein said phase detector circuit comprises:
(a) a limiter amplifier;
(b) a phase detector connected to said limiter amplifier; and
(c) a buffer amplifier connected to said phase detector.

9. An apparatus as defined in claim 4 wherein said RC commutated network comprises:
(a) a plurality of commutating relays;
(b) a plurality of commutated capacitors connected to said plurality of commutating relays;
(c) an amplifier connected to said plurality of commutated capacitors; and
(d) a plurality of resistors connected to said plurality of commutated capacitors and said amplifier.

10. An apparatus as defined in claim 4 wherein said RC commutated network comprises:
(a) input and output terminals;
(b) a first resistor connected to said input terminal;
(c) a series of commutating relay contacts having capacitors connected to said first resistor;
(d) an amplifier connected to said first resistor, said output terminal and said series of commutating relay contacts; and
(e) a feedback circuit having a second resistor connected to said amplifier and said series of commutating relay contacts.

11. An apparatus as defined in claim 4 wherein said RC commutated network comprises:
(a) input and output terminals;
(b) a first amplifier connected to said input terminal;
(c) a first resistor connected to said first amplifier;
(d) a series of commutating relay contacts having capacitors connected to said first resistor;
(e) a second resistor connected to said series of commutating relay contacts;
(f) a second amplifier connected to said second resistor and said series of commutating relay contacts; and
(g) a feedforward circuit having a third resistor connected between said input and said second amplifier.

12. An apparatus as defined in claim 4 wherein said RC commutated network comprises:
(a) input and output terminals;
(b) a first resistor connected to said input terminal;
(c) a series of commutating relay contacts having capacitors and resistors connected to said first resistor and said output terminal; and
(d) an amplifier connected to said first resistor and said output terminal.

13. An apparatus as defined in claim 4 wherein said RC commutated network comprises:
(a) input and output terminals;
(b) a first amplifier connected to said input terminal;
(c) a plurality of commutating relay contacts having resistors and capacitors connected to said first amplifier;
(d) a first resistor and second amplifier connected to said plurality of commutating relay contacts and said output terminal; and
(e) a feedforward circuit having a second resistor connected between said input and said second amplifier.

14. An apparatus as defined in claim 4 wherein said RC commutated network comprises:
(a) input and output terminals;
(b) a first resistor connected to said input terminal;
(c) a series of commutating relay contacts having capacitors connected to said first resistor;
(d) said series of commutating relay contacts being connected to a first ground;
(e) a second resistor connected to said first resistor;
(f) said second resistor being connected to a second ground;
(g) a differential amplifier connected to said first resistor; and
(h) a feedforward circuit connected between said input terminal and said differential amplifier;
(i) said differential amplifier being connected to said output terminal.

15. An apparatus as defined in claim 4 wherein said RC commutated network comprises:
(a) a plurality of electronic switches;
(b) a plurality of commutated capacitors connected to said plurality of electronic switches;
(c) an amplifier connected to said plurality of electronic switches; and
(d) a plurality of resistors connected to said series of electronic switches and said amplifier.

16. An adaptive tracking notch filter system, comprising:
(a) an operational amplifier having input and output terminals;
(b) a first resistor connected to said input terminal;
(c) a feedback circuit having a second resistor connected between said input and output terminals;
(d) a plurality of commutated capacitors connected serially in a feedback circuit from said output terminal to said input terminal;
(e) means for tracking a signal frequency to be suppressed by the notch characteristics of said adaptive tracking notch filter system; and
(f) means for converting said signal frequency into suitable functions to provide a commutation action for said plurality of commutated capacitors.

17. An adaptive tracking band-pass filter for amplification of selected desirable signals of a very low frequency in the presence of undesirable signals, comprising:
(a) a band-pass filter;
(b) phase detector and threshold detection circuits connected to said band-pass filter;
(c) a threshold switch section connected to said phase detector and threshold detection circuits;
(d) a voltage controlled oscillator section connected to said threshold switch section;
(e) a plurality of flip-flop circuits connected to said voltage controlled oscillator section;
(f) a feedback circuit connected between said plurality of flip-flop circuits and said phase detector circuit;
(g) an RC commutated network connected to said plurality of flip-flop circuits; and (h) an amplifier connected to said RC commutated network.

18. An adaptive tracking offset notch filter system, comprising:
(a) a band-pass filter;
(b) phase detector and threshold detection circuits connected to said band-pass filter;
(c) a threshold switch section connected to said phase detector and threshold detection circuits;
(d) a first voltage controlled oscillator section connected to said threshold switch section;
(e) a first plurality of flip-flop circuits connected to said first voltage controlled oscillator section;
(f) a feedback circuit connected between said first plurality of flip-flop circuits and said phase detector circuit;
(g) a second voltage controlled oscillator section connected to said threshold switch section;
(h) a second plurality of flip-flop circuits connected to said second voltage controlled oscillator section;
(i) an RC commutated network connected to said second plurality of flip-flop circuits;
(j) a summing amplifier connected to said RC commutated network; and
(k) a feedforward circuit connected between said band-pass filter and summing amplifier.

19. An adaptive tracking offset notch filter system, comprising:
(a) a band-pass filter;
(b) phase detector and threshold detection circuits connected to said band-pass filter;
(c) a threshold switch section connected to said phase detector and threshold detection circuits;
(d) a voltage controlled oscillator section connected to said threshold switch section;
(e) said voltage controlled oscillator section having a plurality of voltage controlled oscillators;
(f) a first plurality of flip-flop circuits connected to one of said plurality of voltage controlled oscillators;
(g) a feedback circuit connected between said first plurality of flip-flop circuits and said phase detector circuit;
(h) a second plurality of flip-flop circuits connected to another of said plurality of voltage controlled oscillators;
(i) an RC commutated network connected to said second plurality of flip-flop circuits;
(j) a summing amplifier connected to said RC commutated network; and
(k) a feedforward circuit connected between said band-pass filter and summing amplifier.

References Cited

UNITED STATES PATENTS

| 3,241,077 | 3/1966 | Smyth et al. | 328—165 |
| 3,278,866 | 10/1966 | Bose | 333—17 |
| 3,307,408 | 3/1967 | Thomas et al. | 333—17 X |
| 3,322,968 | 5/1967 | Dennis | 328—165 X |

HERMAN KARL SAALBACH, *Primary Examiner.*

P. L. GENSLER, *Assistant Examiner.*